(12) United States Patent
Choi

(10) Patent No.: US 11,891,848 B2
(45) Date of Patent: Feb. 6, 2024

(54) APPARATUS FOR CONTROLLING SAFETY POWER WINDOW OF VEHICLE AND METHOD THEREOF

(71) Applicants: HYUNDAI MOTOR COMPANY, Seoul (KR); Kia Corporation, Seoul (KR)

(72) Inventor: Sung Tae Choi, Gwangmyeong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 322 days.

(21) Appl. No.: 17/499,126

(22) Filed: Oct. 12, 2021

(65) Prior Publication Data

US 2022/0356747 A1    Nov. 10, 2022

(30) Foreign Application Priority Data

May 10, 2021    (KR) .................. 10-2021-0060244

(51) Int. Cl.
*E05F 15/71*    (2015.01)
*E05F 15/73*    (2015.01)
*E05F 15/40*    (2015.01)

(52) U.S. Cl.
CPC .............. *E05F 15/71* (2015.01); *E05F 15/40* (2015.01); *E05F 15/73* (2015.01); *E05Y 2400/44* (2013.01); *E05Y 2400/54* (2013.01); *E05Y 2900/55* (2013.01)

(58) Field of Classification Search
CPC . E05F 15/71; E05F 15/40; E05F 15/73; E05F 15/41; E05F 15/695; E05Y 2400/00; E05Y 2400/44; E05Y 2400/54; E05Y 2400/324; E05Y 2400/332; E05Y 2400/456; E05Y 2400/552; E05Y 2900/55; E05Y 2800/41; G06N 3/084; B60W 40/02
USPC ...................................... 701/45, 49
See application file for complete search history.

(56) References Cited

FOREIGN PATENT DOCUMENTS

KR    20220153169    * 11/2022 .............. E05F 15/41

* cited by examiner

*Primary Examiner* — Hai H Huynh
(74) *Attorney, Agent, or Firm* — MORGAN, LEWIS & BOCKIUS LLP (57) ABSTRACT

An apparatus of controlling a safety power window of a vehicle and a method thereof to not injure the body caught in a window frame, as well as to prevent a malfunction of the safety power window, by adaptively setting an operation reference value of the safety power window, may include a learning device that deep-learns a model which predicts an operation reference value of the safety power window provided in the vehicle, based on driving information of the vehicle, a sensor that collects the driving information of the vehicle, and a controller that obtains the operation reference value of the safety power window corresponding to current driving information of the vehicle by use of the model on which the deep learning is completed, and controls the safety power window according to the operation reference value of the safety power window.

16 Claims, 8 Drawing Sheets

APPARATUS FOR CONTROLLING SAFETY POWER WINDOW OF VEHICLE AND METHOD THEREOF

CROSS-REFERENCE TO RELATED APPLICATION

The present application claims priority to Korean Patent Application No. 10-2021-0060244, filed on May 10, 2021, the entire contents of which is incorporated herein for all purposes by this reference.

BACKGROUND OF THE INVENTION

Field of the Invention

The present invention relates to a technology that controls an operation of a safety power window provided in a vehicle, based on deep learning.

Description of Related Art

In general, deep learning (or deep neural network) is a type of machine learning, in which a multi-layered artificial neural network (ANN) is configured between an input and an output, and such an artificial neural network may include a convolutional neural network (CNN) or a recurrent neural network (RNN), depending on structures, problems to be solved, and purposes.

Meanwhile, a safety power window control apparatus provided in a vehicle allows a driver to easily open or close a window glass of the vehicle to a desired position through a simple switch operation, by controlling a drive motor to raise or lower the window glass of the vehicle in a response to the driver's switch operation.

The safety power window control apparatus may lower the window glass to protect a body when the body jamming is detected while the window glass is rising, to prevent an accident where the body (or object) such as a finger, arm, head, or neck of a person in a rear seat, is caught between the window glass and a window frame when the driver closes the window glass in the rear seat using the switch.

The safety power window control apparatus determines whether the body is caught, based on a pulse signal detected by a hall sensor located around a ring magnet which is fixed to a rotation shaft of the drive motor, and may allow the drive motor to lower the window glass when it is determined that the body is caught.

A related art of controlling the safety power window operates the safety power window when a force (load) acting in a downward direction of the window glass exceeds a fixed reference value due to body jamming. In the instant case, the related art allows the drive motor to lower the window glass.

In such related art, when an operation reference value of the safety power window is set high, it may cause bodily injury, and when the operation reference value of the safety power window is set low, it may cause malfunction. Therefore, it is difficult to set an optimum operation reference value.

The information included in this Background of the Invention section is only for enhancement of understanding of the background of the invention and may not be taken as an acknowledgement or any form of suggestion that this information forms the prior art already known to a person skilled in the art.

BRIEF SUMMARY

Various aspects of the present invention are directed to providing an apparatus and a method for controlling a safety power window of a vehicle configured for not injuring a body caught in a window frame, as well as preventing a malfunction of the safety power window through adaptive setting of an operation reference value of the safety power window, by deep learning a model (a model that predicts the operation reference value of the safety power window provided in the vehicle based on driving information of the vehicle), predicting the operation reference value of the safety power window corresponding to current driving information of the vehicle using the model on which the deep learning is completed, and controlling the operation of the safety power window based on the predicted operation reference value.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains. Furthermore, it will be readily apparent that the objects and advantages of the present invention may be realized by the means and combinations thereof indicated in the appended claims.

According to various aspects of the present invention, an apparatus of controlling a safety power window of a vehicle includes a learning device that deep-learns a model which predicts an operation reference value of the safety power window provided in the vehicle, based on driving information of the vehicle, a sensor that collects the driving information of the vehicle, and a controller that obtains the operation reference value of the safety power window corresponding to current driving information of the vehicle by use of the model on which the deep learning is completed and control the safety power window according to the operation reference value of the safety power window.

In various exemplary embodiments of the present invention, the apparatus may further include storage that stores the model on which the deep learning is completed.

In various exemplary embodiments of the present invention, the driving information of the vehicle may include at least one of road information on which the vehicle is traveling, a speed of the vehicle, road surface information on a road on which the vehicle is traveling, seating information of a seat in the vehicle, an outdoor temperature, and an accumulated driving mileage of the vehicle.

In various exemplary embodiments of the present invention, the learning device may learn the model to increase the operation reference value of the safety power window, to prevent a malfunction of the safety power window when the seat in the vehicle is vacant, and may deep-learn the model to lower the operation reference value of the safety power window, to protect a person's body when the person is accommodated on the seat in the vehicle.

In various exemplary embodiments of the present invention, the learning device may deep-learn the model to increase the operation reference value of the safety power window to prevent a malfunction of the safety power window, when the outdoor temperature is below a reference value.

In various exemplary embodiments of the present invention, the learning device may deep-learn the model to increase the operation reference value of the safety power window to prevent a malfunction of the safety power window, when a driving mileage of the vehicle is less than a reference distance.

In various exemplary embodiments of the present invention, the controller may lower the safety power window when a reversal force of the safety power window exceeds the operation reference value of the safety power window.

In various exemplary embodiments of the present invention, the controller may adaptively set the operation reference value of the safety power window depending on a driving environment of the vehicle.

According to various aspects of the present invention, a method for controlling a safety power window of a vehicle includes deep learning, by a learning device, a model which predicts an operation reference value of the safety power window provided in the vehicle, based on driving information of the vehicle, collecting, by a sensor, current driving information of the vehicle, and obtaining, by a controller, the operation reference value of the safety power window corresponding to the current driving information of the vehicle by use of the model on which the deep learning is completed, and controlling the safety power window according to the operation reference value of the safety power window.

In various exemplary embodiments of the present invention, the method may further include storing, by a storage, the model on which the deep learning is completed.

In various exemplary embodiments of the present invention, the driving information of the vehicle may include at least one of road information on which the vehicle is traveling, a speed of the vehicle, road surface information on a road on which the vehicle is traveling, seating information of a seat in the vehicle, an outdoor temperature, and an accumulated driving mileage of the vehicle.

In various exemplary embodiments of the present invention, the deep learning of the model may include learning the model to increase the operation reference value of the safety power window, to prevent a malfunction of the safety power window when the seat in the vehicle is vacant, and deep learning the model to lower the operation reference value of the safety power window, to protect a person's body when the person is accommodated on the seat in the vehicle.

In various exemplary embodiments of the present invention, the deep learning of the model may include deep learning the model to increase the operation reference value of the safety power window to prevent a malfunction of the safety power window when the outdoor temperature is below a reference value.

In various exemplary embodiments of the present invention, the deep learning of the model may include deep learning the model to increase the operation reference value of the safety power window to prevent a malfunction of the safety power window when a driving mileage of the vehicle is less than a reference distance.

In various exemplary embodiments of the present invention, the controlling of the safety power window may include lowering the safety power window when a reversal force of the safety power window exceeds the operation reference value of the safety power window.

In various exemplary embodiments of the present invention, the controlling of the safety power window may include adaptively setting the operation reference value of the safety power window according to the driving information of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Figure 1:
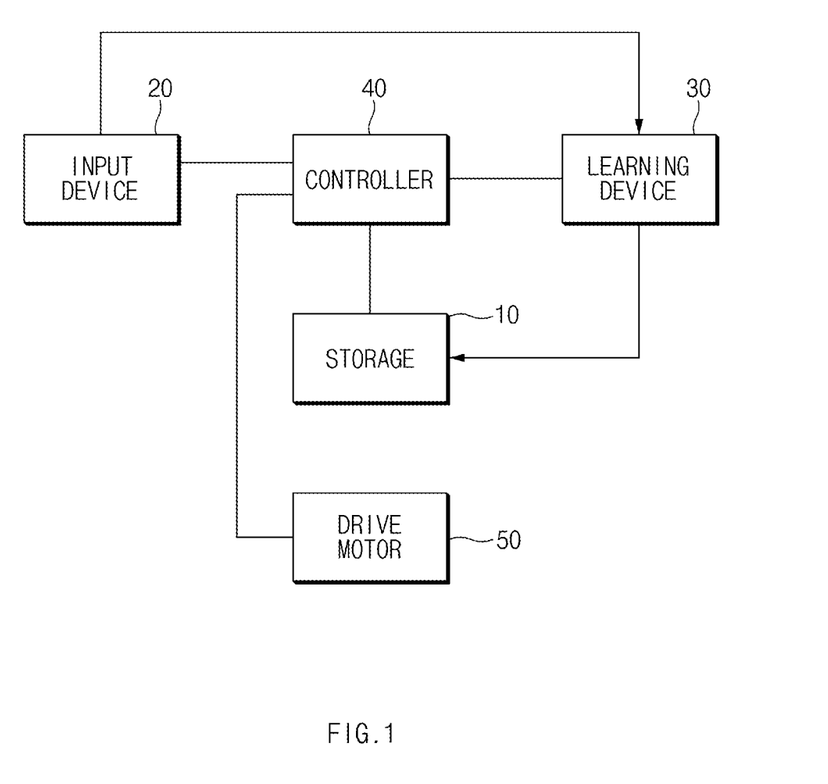
FIG. 1 is a schematic diagram of a safety power window control apparatus of a vehicle according to various exemplary embodiments of the present invention.

FIG. 1 is a schematic diagram of a safety power window control apparatus of a vehicle according to various exemplary embodiments of the present invention.

As illustrated in FIG. 1, a safety power window control apparatus of a vehicle according to various exemplary embodiments of the present invention includes storage 10, an input device 20, a learning device 30, and a controller 40, and an actuator 50. In the instant case, according to a method of implementing the safety power window control apparatus of a vehicle according to various exemplary embodiments of the present invention, each component may be combined with each other to be implemented as one, or some components may be omitted. In detail, the learning device 30 may be merged with the controller 40 and in the instant case, the controller 40 may perform all functions of the learning device 30. Furthermore, the actuator 50 may include a drive motor.

Looking at each of the components, first, the storage 10 may store various logics and algorithms, and programs required in a process of deep learning a model (a model that predicts the operation reference value of the safety power window provided in the vehicle based on driving information of the vehicle), a process of predicting the operation reference value of the safety power window corresponding to current driving information of the vehicle using the model on which the deep learning is completed, and a process of controlling the operation of the safety power window based on the predicted operation reference value. In the instant case, the driving information of the vehicle may include road information (e.g., highway, city street, unpaved road, etc.), a vehicle speed, road surface information (e.g., road slope, porthole, speed bump, etc.), seating information of each seat in the vehicle, an outdoor temperature, an accumulated driving mileage of the vehicle, etc.

The storage 10 may store a model on which deep learning is completed by the learning device 30.

The storage 10 may include at least one type of a storage medium among a memory such as a flash memory, a hard disk, a micro type memory, and a card type memory (e.g., a SD card (Secure Digital card) or an XD card (eXtream Digital card)), and a memory such as a RAM (Random Access Memory), an SRAM (Static RAM), a ROM (Read-Only Memory), a PROM (Programmable ROM), an EEPROM (Electrically Erasable PROM), a magnetic memory (MRAM), a magnetic disk, and an optical disk type memory.

The input device 20 may input the driving information of the vehicle required in the deep learning process of the model that predicts the operation reference value of the safety power window provided in the vehicle to the learning device 30.

The input device 20 may input the current driving information of the vehicle required in the model that predicts the operation reference value of the safety power window at the current time to the controller 40.

Figure 2:
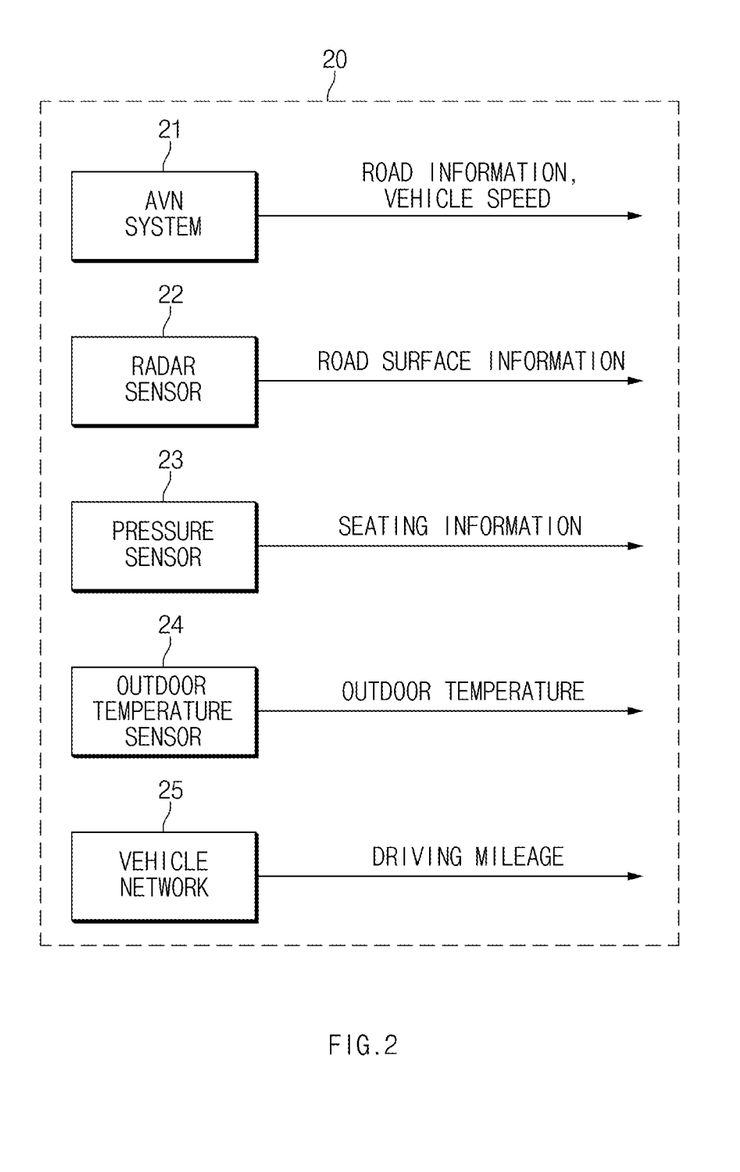
FIG. 2 is a detailed schematic diagram of an input device provided in a safety power window control apparatus of a vehicle according to various exemplary embodiments of the present invention.

The input device 20 is a kind of sensor device and may include components as illustrated in FIG. 2 to collect the driving information of the vehicle.

FIG. 2 is a detailed schematic diagram of an input device provided in a safety power window control apparatus of a vehicle according to various exemplary embodiments of the present invention.

As illustrated in FIG. 2, the input device 20 provided in the safety power window control apparatus of the vehicle according to various exemplary embodiments of the present invention may include an AVN (audio video navigation) system 21, a radar sensor 22, a pressure sensor 23, an outdoor temperature sensor 24, and a vehicle network 25.

The AVN system 21 is disposed with a precision map, a Global Positioning System (GPS) receiver, and a gyro sensor, and may obtain the road information (e.g., highway, city street, unpaved road, etc.) and the vehicle speed information while the vehicle is traveling.

The radar (radio detecting and ranging) sensor 22 may be replaced with a Light Detection and Ranging (LiDAR) sensor or an ultrasonic sensor, and may detect the road surface information (e.g., a slope of the road surface, portholes, speed bumps, etc.) on which the vehicle is traveling.

The pressure sensor 23 may be replaced with a sitting sensor or a seat belt sensor and may detect a person sitting on each seat of the vehicle. That is, the pressure sensor 23 may detect seating information for each seat.

The outdoor temperature sensor 24 may measure an outdoor temperature of the vehicle.

The vehicle network 25 may collect accumulated driving mileage information of the vehicle. In the instant case, the vehicle network includes a Controller Area Network (CAN), a Local Interconnect Network (LIN), a FlexRay, a Media Oriented Systems Transport (MOST), an Ethernet, etc.

The learning device 30 may generate a learning table as illustrated in [Table 1] below based on the driving information of the vehicle input through the input device 20 and may deep-learn the model such that the model may predict the operation reference value of the safety power window provided in the vehicle, based on the generated learning table. In the instant case, the model is a model that predicts an optimal operation reference value of the safety power window provided in the vehicle, based on the learning table.

TABLE 1

| No. | Road | vehicle speed | slope | seated | outdoor temperature | accumulated driving mileage | Tuning value compared to reference value |
|---|---|---|---|---|---|---|---|
| 1 | city street | stop | X | X | room temperature | middle term | 2500 |
| 2 | city street | stop | X | ○ | room temperature | middle term | 2000 |
| 3 | city street | low speed | X | X | room temperature | middle term | 2600 |
| 4 | highway | medium speed | ○ | X | room temperature | middle term | 2700 |
| 5 | highway | medium speed | ○ | X | Low temperature | middle term | 2800 |
| 6 | unpaved road | low speed | ○ | X | Low temperature | initial term | 2900 |
| 7 | city street | low speed | ○ | ○ | Low temperature | initial term | 2200 |
| ... | ... | ... | ... | ... | ... | ... | ... |

In [Table 1], seven cases are exemplified to help understanding, but the number of cases may be arbitrarily changed according to an intention of the designer.

In [Table 1], "low speed" represents, for example, a state in which the vehicle speed is 70 kph or less, "medium speed" represents, for example, a state in which the vehicle speed is more than 70 kph and 120 kph or less, and "high speed" represents, for example, a state in which the vehicle speed exceeds 120 kph. The "slope" indicates a slope of the vehicle depending on the road surface information, "X" indicates a state in which the vehicle is not tilted because there is no slope (the slope is within a reference range), and "○" indicates a state in which the vehicle is tilted because there is a slope of the road surface (the slope exceeds the reference range). Also, the "slope" may include a subdivided tilt for each wheel (left front wheel, right front wheel, left rear wheel, right rear wheel) of the vehicle. Whether of "accommodated" may include whether each seat of the vehicle is accommodated. The "low temperature" refers to, for example, a state in which the outdoor temperature is below 0° C., the "room temperature" refers to, for example, a condition in which the outdoor temperature is greater than 0° C. and less than or equal to 25° C., and "high temperature" refers to, for example, a condition in which the outdoor temperature exceeds 25° C. The "initial term" may represent, for example, a state in which the vehicle's cumulative mileage is less than 10000 km (low aging), the "middle term" may represent, for example, a state in which the vehicle's cumulative mileage is greater than 10000 km and less than or equal to 50000 km (middle age), and "late term" may represent, for example, a state in which the vehicle's cumulative mileage exceeds 50000 km (high age).

In [Table 1], the tuning value compared to the reference value has a relationship as illustrated in [Table 2] below. In the instant case, the tuning value is a value for expressing a reversal force (reference value) numerically.

TABLE 2

| tuning value | reference value |
|---|---|
| 2500 | 70N |
| 2600 | 72N |
| 2000 | 60N |

In [Table 2], when the tuning value is 2700, the reference value becomes 74N, when the tuning value is 2800, the reference value becomes 76N, when the tuning value is 2900, the reference value becomes 78N, and when the tuning value is 2200, the reference value becomes 64N.

The learning device 30 may deep-learn the model to increase or maintain reference values when the vehicle is traveling on the unpaved road, when the vehicle is traveling at a high speed, and when the vehicle is tilted.

The learning device 30 may learn the model to increase the operation reference value of the safety power window such that the safety power window is prevented from a malfunction when the seat in the vehicle is empty, and may deep-learn the model to lower the operation reference value of the safety power window to protect the body when a person sits on the seat in the vehicle.

Since a rising force of the window glass increases as an revolutions per minute (RPM) of the drive motor decreases when the outdoor temperature is low, the learning device 30 may deep-learn the model to increase the operation reference value of the safety power window to prevent the malfunction of the safety power window.

The learning device 30 may deep-learn the model to increase the operation reference value of the safety power window to prevent the malfunction of the safety power window as the load increases when the accumulated driving mileage of the vehicle is the initial term.

Figure 3:
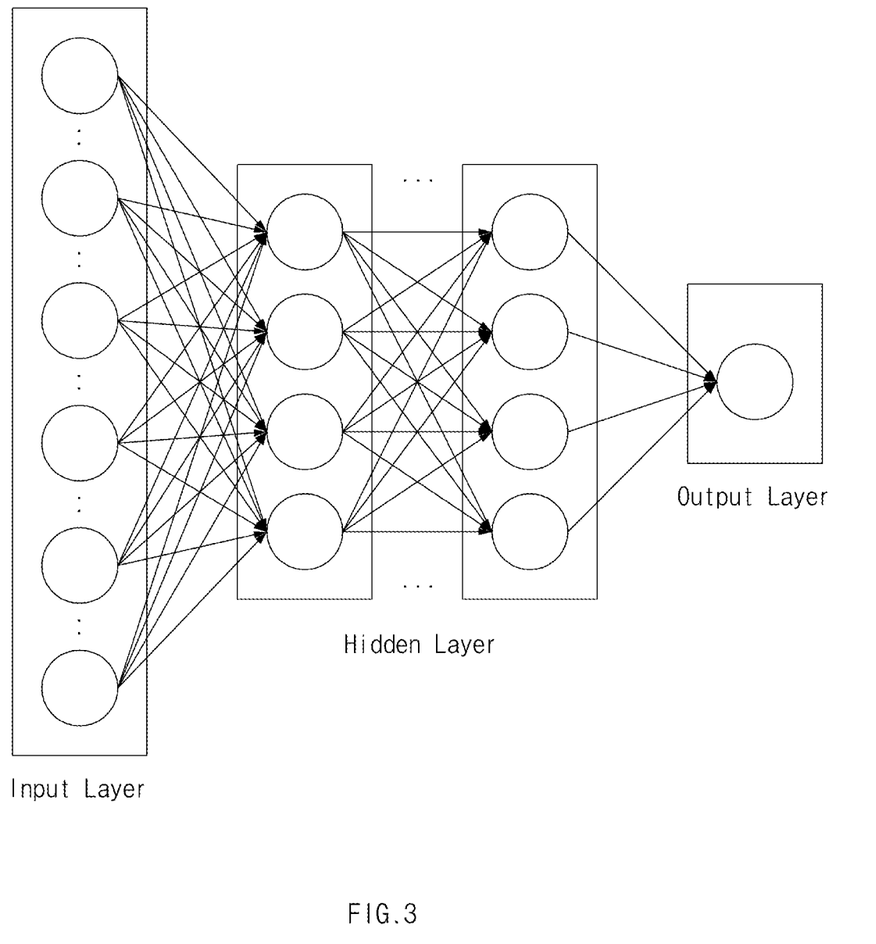
FIG. 3 is a structural diagram of a model in which deep learning is performed by a learning device provided in a safety power window control apparatus of a vehicle according to various exemplary embodiments of the present invention.

The learning device 30 may deep-learn a model as illustrated in FIG. 3 as an example.

FIG. 3 is a structural diagram of a model in which deep learning is performed by a learning device provided in a safety power window control apparatus of a vehicle according to various exemplary embodiments of the present invention.

As illustrated in FIG. 3, the model may include an input layer that receives vehicle driving information (road information, vehicle speed, inclination, seating status, outdoor temperature, accumulated driving mileage), a hidden layer (hidden layer 1, hidden layer 2, . . . , and hidden layer 6) that predicts the operation reference value of the safety power window, and an output layer that outputs the operation reference value of the safety power window. In the instant case, an objective function may include a mean absolute error (MAE), the number of hidden layers may be, for example, six, and an optimizer device may be, for example, 'RMSProp'.

Figure 4A:
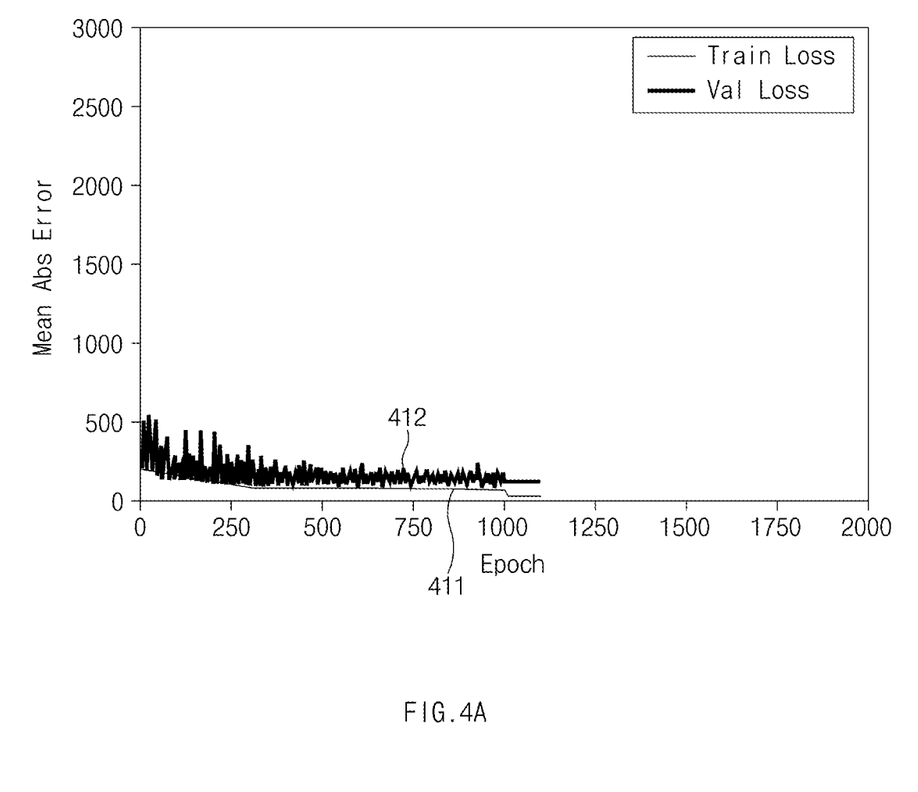
FIG. 4A is a diagram illustrating a performance of a model in which deep learning is completed by a learning device provided in a safety power window control apparatus of a vehicle according to various exemplary embodiments of the present invention.

FIG. 4A is a diagram illustrating a performance of a model in which deep learning is completed by a learning device provided in a safety power window control apparatus of a vehicle according to various exemplary embodiments of the present invention.

In FIG. 4A, a horizontal axis represents 'Epoch', a vertical axis represents 'MAE', and deep learning of the model has performed such that a difference between a train Loss 411 and a validation loss 412 is minimized. In the instant case, 'Epoch' means the number of times that an entire training set has passed through the neural network in deep learning. For example, 1-epoch means that the entire training set is applied to one neural network and passed through the neural network once through feedforward and backpropagation.

Figure 4B:
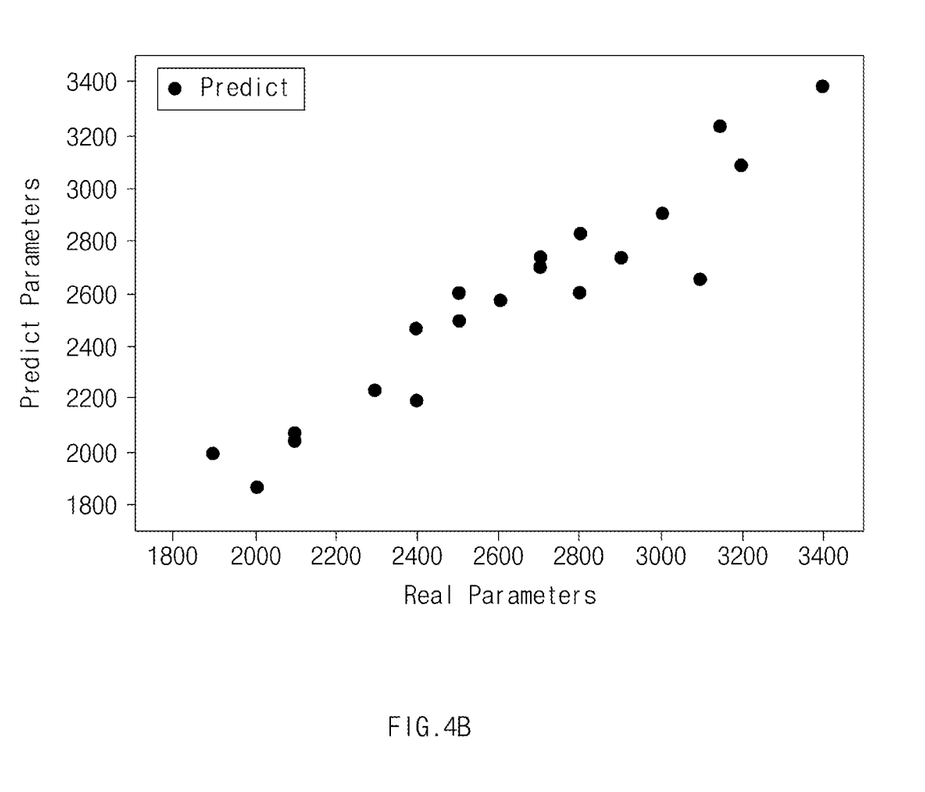
FIG. 4B is another diagram illustrating a performance of a model in which deep learning is completed by a learning device provided in a safety power window control apparatus of a vehicle according to various exemplary embodiments of the present invention.

FIG. 4B is another diagram illustrating a performance of a model in which deep learning is completed by a learning device provided in a safety power window control apparatus of a vehicle according to various exemplary embodiments of the present invention.

In FIG. 4B, a horizontal axis indicates real parameters, and a vertical axis indicates predicted parameters. In the instant case, the real parameter and the predicted parameter may be expressed as tuning values illustrated in [Table 1]. It may be seen from FIG. 4B that the error between the real parameters and the predicted parameters is within a threshold.

The controller 40 may perform overall control such that each of the components may perform their functions normally. The controller 40 may be implemented in a form of hardware, may be implemented in a form of software, or may be implemented in a form of a combination of hardware and software. The controller 40 may be implemented as a microprocessor but is not limited thereto.

The controller 40 may deep-learn a model (a model that predicts the operation reference value of the safety power window provided in the vehicle based on the driving information of the vehicle), may predict the operation reference value of the safety power window corresponding to the current driving information of the vehicle by use of the model on which the deep learning is completed, and may perform various controls in a process of controlling the operation of the safety power window based on the predicted operation reference value.

The controller 40 may control the learning device 30 for deep learning the model, and the function of the learning device 30 may be performed by the controller 40.

The controller 40 determines whether the body is caught on the basis of a pulse signal detected by a hall sensor which is located in the vicinity of the ring magnet fixed to the rotation shaft of the drive motor, and when it is determined that the body is caught, may control drive motor to lower the window glass.

The controller 40 may determine a reversal force using the pulse signal detected by the Hall sensor. In the instant case, the reversal force means a force (load) acting in the downward direction of the window glass due to a pinching of the body. For example, when the window glass rises by 1 mm, a force of 10N is generated, and when the drive motor rotates once, the window glass rises by 2 mm. Therefore, the reversal force may be determined through the number of revolutions (RPM) of the drive motor. For example, when the number of revolutions of the drive motor is '5', the reversal force of 100N is generated.

Figure 5:
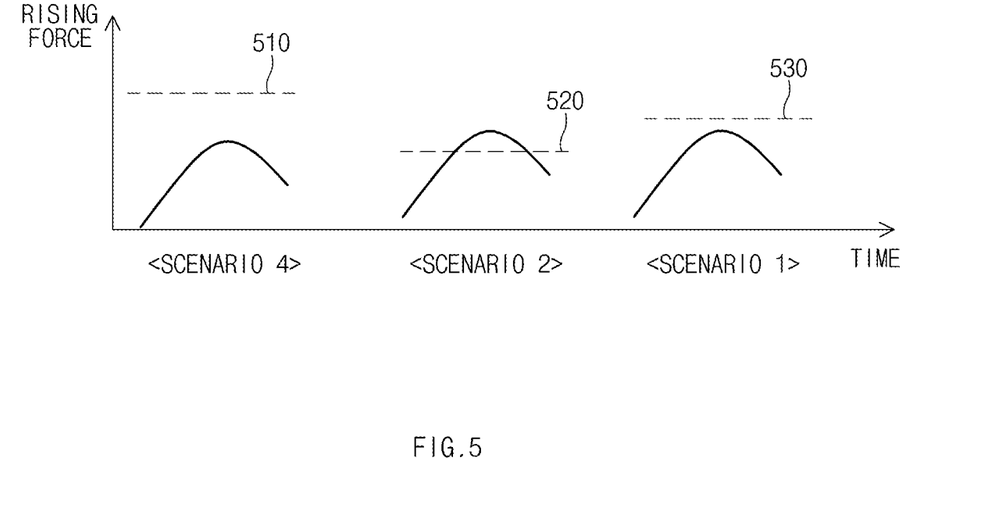
FIG. 5 is a diagram for describing an operation of a controller provided in safety power window control apparatus of a vehicle according to various exemplary embodiments of the present invention.

The controller 40 may predict the operation reference value of the safety power window corresponding to the current driving information of the vehicle by use of the model on which the deep learning is completed, and then adaptively set the operation reference value of the safety power window depending on the driving environment of the vehicle as illustrated in FIG. 5.

FIG. 5 is a diagram for describing an operation of a controller provided in safety power window control apparatus of a vehicle according to various exemplary embodiments of the present invention As illustrated in FIG. 5, the controller 40 provided in the safety power window control apparatus of a vehicle according to various exemplary embodiments of the present invention may input the current driving information of the vehicle to the model on which the deep learning is completed, and may set the predicted reference value as the operation reference value of the safety power window. In the instant case, the reference value predicted by the model may be a first reference value 510, a second reference value 520, or a third reference value 530 depending on the current driving environment (driving information) of the vehicle.

Accordingly, the controller 40 may apply the first reference value 510 when the driving environment of the vehicle is a scenario 4, may apply the second reference value 520 when the driving environment of the vehicle is a scenario 2, and may apply the third reference value 530 when the driving environment of the vehicle is a scenario 1.

Figure 6:
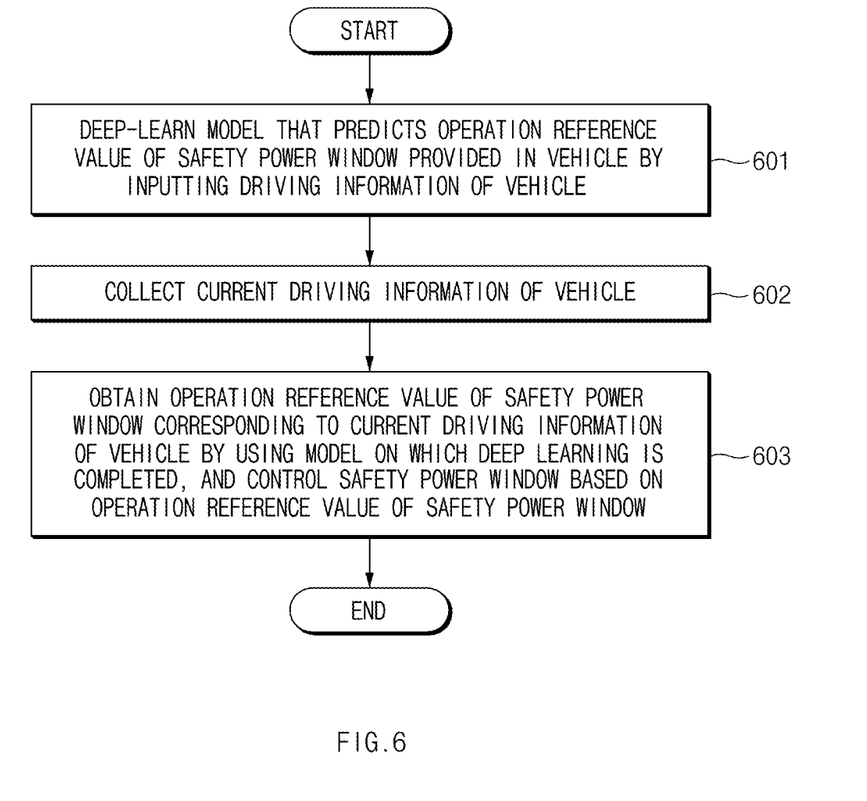
FIG. 6 is a flowchart illustrating a safety power window control method of a vehicle according to various exemplary embodiments of the present invention.

FIG. 6 is a flowchart illustrating a safety power window control method of a vehicle according to various exemplary embodiments of the present invention.

First, the learning device 30 deep-learns a model that predicts the operation reference value of the safety power window provided in the vehicle by inputting the driving information of the vehicle (601). That is, the learning device 30 deep-learns the model such that the model receiving the driving information of the vehicle predicts the operation reference value of the safety power window provided in the vehicle. In the instant case, the model predicts the operation reference value of the safety power window provided in the vehicle, based on the driving information of the vehicle.

Thereafter, the input device 20 collects the current driving information of the vehicle (602). In the instant case, the input device 20 may include a plurality of sensors.

Thereafter, the controller 40 obtains the operation reference value of the safety power window corresponding to the current driving information of the vehicle by use of the model on which the deep learning is completed, and controls the safety power window, based on the operation reference value of the safety power window (603).

Figure 7:
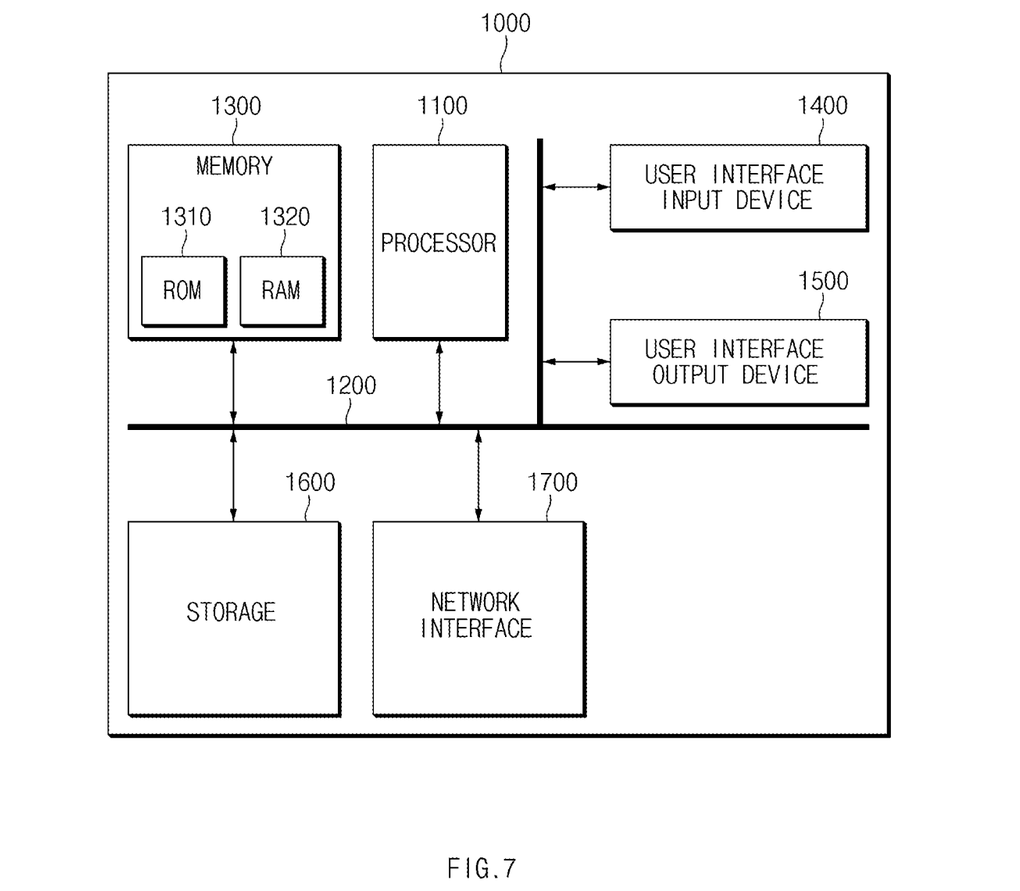
FIG. 7 is a block diagram illustrating a determining system for executing a safety power window control method of a vehicle according to various exemplary embodiments of the present invention.

FIG. 7 is a block diagram illustrating a computing system for executing a safety power window control method of a vehicle according to various exemplary embodiments of the present invention.

Referring to FIG. 7, the above-described safety power window control method of a vehicle according to various exemplary embodiments of the present invention may be implemented through a computing system. A computing system 1000 may include at least one processor 1100, a memory 1300, a user interface input device 1400, a user interface output device 1500, storage 1600, a network interface 1700, which are connected through a system bus 1200.

The processor 1100 may be a central processing unit (CPU) or a semiconductor device that executes processing on instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the method or the steps of algorithm described in connection with the exemplary embodiments included herein may be implemented directly in hardware, a software module, or a combination of the two, which is executed by the processor 1100. The software module may reside in a storage medium (i.e., the memory 1300 and/or the storage 1600) such as a RAM, a flash memory, a ROM, an EPROM, an EEPROM, a register, a hard disk, a removable disk, and a CD-ROM. The storage medium as an example is coupled to the processor 1100, the processor 1100 may read information from, and write information to, the storage medium. Alternatively, the storage medium may be integrated with the processor 1100. The processor and storage medium may reside within an application specific integrated circuit (ASIC). The ASIC may reside within the user terminal. Alternatively, the processor and storage medium may reside as separate components within the user terminal.

According to various exemplary embodiments of the present invention, an apparatus and a method for controlling a safety power window of a vehicle not only do not injure a body caught in the window frame, but also may prevent a malfunction of a safety power window through adaptive setting of an operation reference value of the safety power window, by deep learning a model (a model that predicts the operation reference value of the safety power window provided in the vehicle based on driving information of the vehicle), predicting the operation reference value of the safety power window corresponding to current driving information of the vehicle using the model on which the deep learning is completed, and controlling the operation of the safety power window based on the predicted operation reference value.

The above description is merely illustrative of the technical idea of the present invention, and those of ordinary skill in the art to which various exemplary embodiments of the present invention pertains will be able to make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a safety power window of a vehicle, the apparatus comprising:
   a learning device configured to deep-learn a model which predicts an operation reference value of the safety power window provided in the vehicle, according to driving information of the vehicle;
   a sensor configured to collect the driving information of the vehicle; and
   a controller configured to obtain the operation reference value of the safety power window corresponding to current driving information of the vehicle by use of the model on which the deep learning is completed, and to control the safety power window according to the operation reference value of the safety power window.

2. The apparatus of claim 1, further including:
   a storage configured to store the model on which the deep learning is completed.

3. The apparatus of claim 1, wherein the driving information of the vehicle includes at least one of road information on which the vehicle is traveling, a speed of the vehicle, road surface information on a road on which the vehicle is traveling, seating information of a seat in the vehicle, an outdoor temperature, and an accumulated driving mileage of the vehicle.

4. The apparatus of claim 3, wherein the learning device is configured to learn the model to increase the operation reference value of the safety power window, to prevent a malfunction of the safety power window when the seat in the vehicle is vacant, and to deep-learn the model to lower the operation reference value of the safety power window, to protect a person's body when the person is accommodated on the seat in the vehicle.

5. The apparatus of claim 3, wherein the learning device is configured to deep-learn the model to increase the operation reference value of the safety power window to prevent a malfunction of the safety power window, when the outdoor temperature is below a reference value.

6. The apparatus of claim 3, wherein the learning device is configured to deep-learn the model to increase the operation reference value of the safety power window to prevent a malfunction of the safety power window, when the accumulated driving mileage of the vehicle is less than a reference distance.

7. The apparatus of claim 1, wherein the controller is configured to lower the safety power window when a reversal force of the safety power window exceeds the operation reference value of the safety power window.

8. The apparatus of claim 1, wherein the controller is configured to adaptively set the operation reference value of the safety power window depending on a driving environment of the vehicle.

9. A method for controlling a safety power window of a vehicle, the method comprising:
   deep learning, by a learning device, a model which predicts an operation reference value of the safety power window provided in the vehicle, according to driving information of the vehicle;
   collecting, by a sensor, current driving information of the vehicle; and
   obtaining, by a controller, the operation reference value of the safety power window corresponding to the current driving information of the vehicle by use of the model on which the deep learning is completed, and controlling the safety power window according to the operation reference value of the safety power window.

10. The method of claim 9, further including:
    storing, by a storage, the model on which the deep learning is completed.

11. The method of claim 9, wherein the driving information of the vehicle includes at least one of road information on which the vehicle is traveling, a speed of the vehicle, road surface information on a road on which the vehicle is traveling, seating information of a seat in the vehicle, an outdoor temperature, and an accumulated driving mileage of the vehicle.

12. The method of claim 11, wherein the deep learning of the model includes:
learning the model to increase the operation reference value of the safety power window, to prevent a malfunction of the safety power window when the seat in the vehicle is vacant; and
deep learning the model to lower the operation reference value of the safety power window, to protect a person's body when the person is accommodated on the seat in the vehicle.

13. The method of claim 11, wherein the deep learning of the model includes:
deep learning the model to increase the operation reference value of the safety power window to prevent a malfunction of the safety power window when the outdoor temperature is below a reference value.

14. The method of claim 11, wherein the deep learning of the model includes:
deep learning the model to increase the operation reference value of the safety power window to prevent a malfunction of the safety power window when the accumulated driving mileage of the vehicle is less than a reference distance.

15. The method of claim 9, wherein the controlling of the safety power window includes:
lowering the safety power window when a reversal force of the safety power window exceeds the operation reference value of the safety power window.

16. The method of claim 9, wherein the controlling of the safety power window includes:
adaptively setting the operation reference value of the safety power window according to the driving information of the vehicle.

* * * * *